US011052335B2

(12) United States Patent
Baxter

(10) Patent No.: US 11,052,335 B2
(45) Date of Patent: *Jul. 6, 2021

(54) OIL FILTER ADAPTER

(71) Applicant: Kevin Baxter, Spokane, WA (US)

(72) Inventor: Kevin Baxter, Spokane, WA (US)

(*) Notice: Subject to any disclaimer, the term of this patent is extended or adjusted under 35 U.S.C. 154(b) by 228 days.

This patent is subject to a terminal disclaimer.

(21) Appl. No.: 16/261,231

(22) Filed: Jan. 29, 2019

(65) Prior Publication Data
US 2019/0151785 A1 May 23, 2019

Related U.S. Application Data

(63) Continuation of application No. 15/186,218, filed on Jun. 17, 2016, now Pat. No. 10,195,553.

(51) Int. Cl.
B01D 35/30 (2006.01)
F01M 11/03 (2006.01)
B01D 35/00 (2006.01)

(52) U.S. Cl.
CPC ......... *B01D 35/306* (2013.01); *B01D 35/005* (2013.01); *F01M 11/03* (2013.01); *B01D 2201/4023* (2013.01); *F01M 2011/031* (2013.01)

(58) Field of Classification Search
CPC .......... F01M 2011/031; B01D 35/306
See application file for complete search history.

(56) References Cited

U.S. PATENT DOCUMENTS

| 4,492,632 | A  | * | 1/1985  | Mattson ............... | B01D 29/114 |
|-----------|----|---|---------|------------------------|-------------|
|           |    |   |         |                        | 210/167.05  |
| 4,783,256 | A  |   | 11/1988 | Cooper et al.          |             |
| 5,653,206 | A  |   | 8/1997  | Spurgin                |             |
| 5,813,382 | A  |   | 9/1998  | Grigorian et al.       |             |
| 5,887,561 | A  |   | 3/1999  | Spurgin                |             |
| 6,471,005 | B1 | * | 10/2002 | Zager .................. | F01M 11/045 |
|           |    |   |         |                        | 184/1.5     |
| 6,488,848 | B1 |   | 12/2002 | Smith                  |             |
| 9,109,478 | B2 |   | 8/2015  | Reinosa                |             |
| 2014/0037235 | A1 |   | 2/2014  | Raby et al.         |             |
| 2014/0110321 | A1 |   | 4/2014  | Bertin et al.       |             |
| 2014/0246380 | A1 |   | 9/2014  | Rohrbach et al.     |             |

OTHER PUBLICATIONS

Office Action for U.S. Appl. No. 15/186,218, dated Oct. 24, 2018, Baxter, "Oil Filter Adapter", 8 pages.

(Continued)

*Primary Examiner* — David C Mellon
(74) *Attorney, Agent, or Firm* — Lee & Hayes, P.C.

(57) ABSTRACT

An oil filter adapter device may be used to enable an engine or other machine that was manufactured for using cartridge oil filters to use spin-on oil filters. In some examples, the oil filter adapter may have a docking collar for coupling with an engine, a cylindrical base for coupling with an oil filter housing, and an attachment piece for coupling with a spin-on oil filter. The oil filter adapter may also have a spring disposed between the docking collar and the cylindrical base such that the docking collar is compressible relative to the cylindrical base to allow the oil filter adapter is able to couple to a variety of oil filter housings ranging in size and shape.

19 Claims, 16 Drawing Sheets

(56) References Cited

OTHER PUBLICATIONS

Inengineering.com, "Products," retrieved on Jun. 20, 2016 at <<http://Inengineering.com/spin-on-oil-filter-adapter-for-my09-and-later-9a1-engines-boxster-cayman-only.html>> 3 pages.

"LN Engineering 106-01.3 Spin-on Oil Filter Adapter for Porche Later models", retrieved on Oct. 18, 2018 at <<htttps://www.amazon.com/Engineering-I 06-01-3-Filter-Adapter-Porche/dp/B00FOVQBKC>>, Amazon.com, 2014, 4 pages.

Australian Office Action dated Oct. 7, 2020 for Australian Patent Application No. 2016250414, a counterpart foreign application of the U.S. Appl. No. 15/186,218, 3 pages.

Australian Office Action dated May 15, 2020 for Australian Patent Application No. 2016250414, a counterpart foreign application of the U.S. Appl. No. 15/186,218, 5 pages.

\* cited by examiner

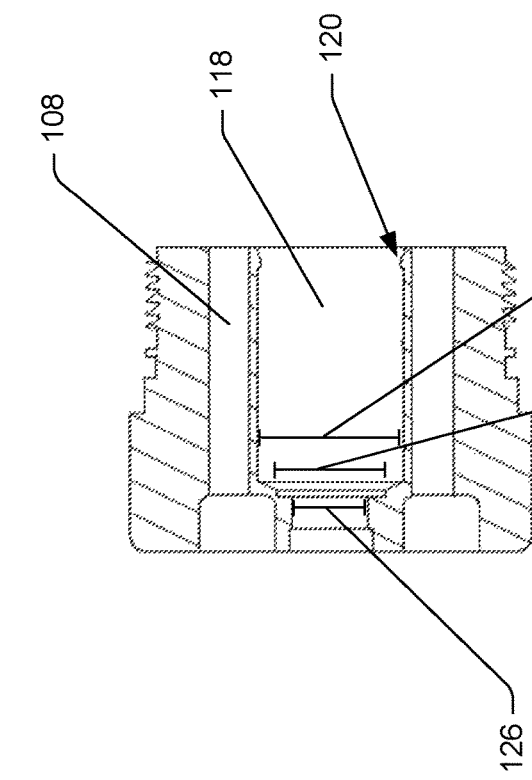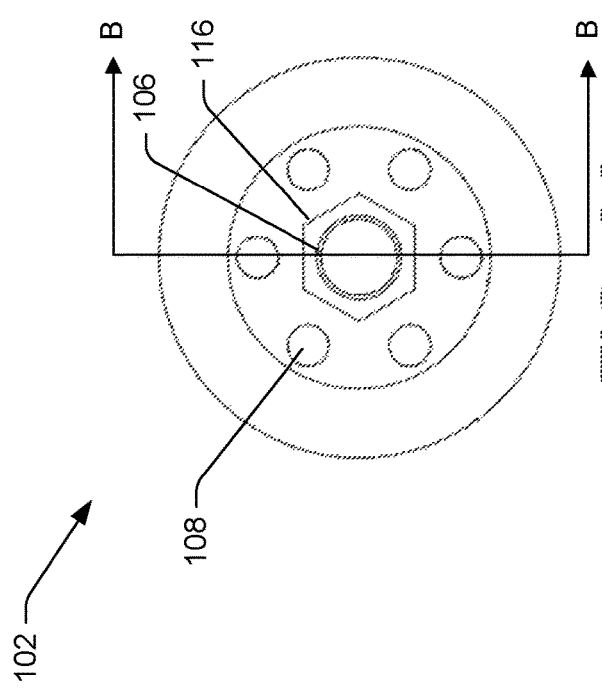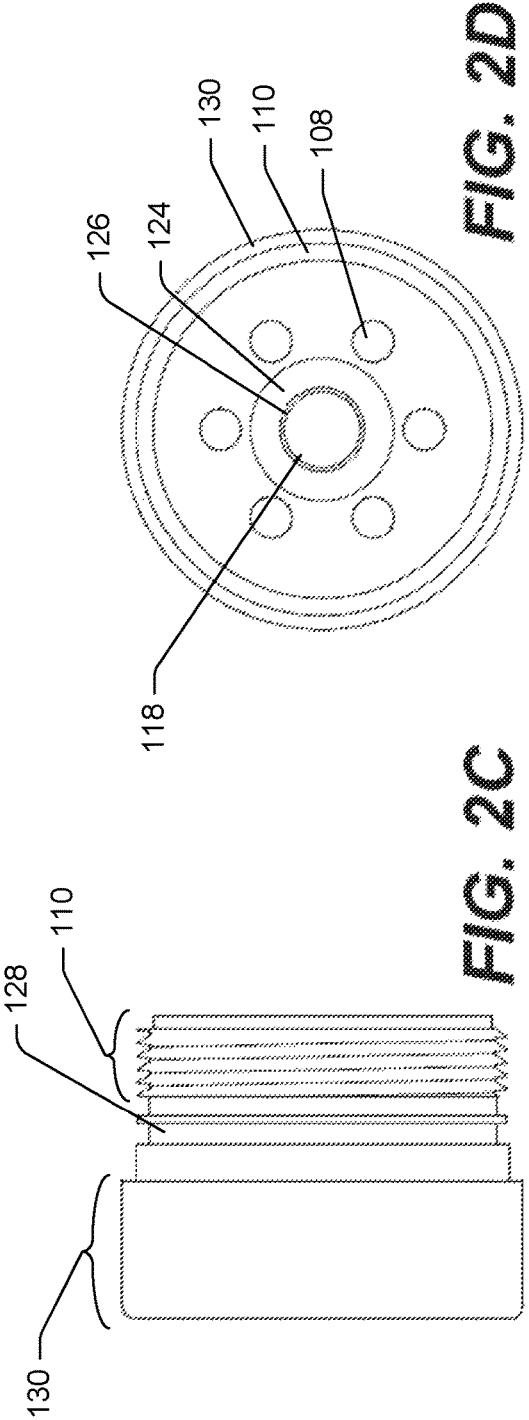

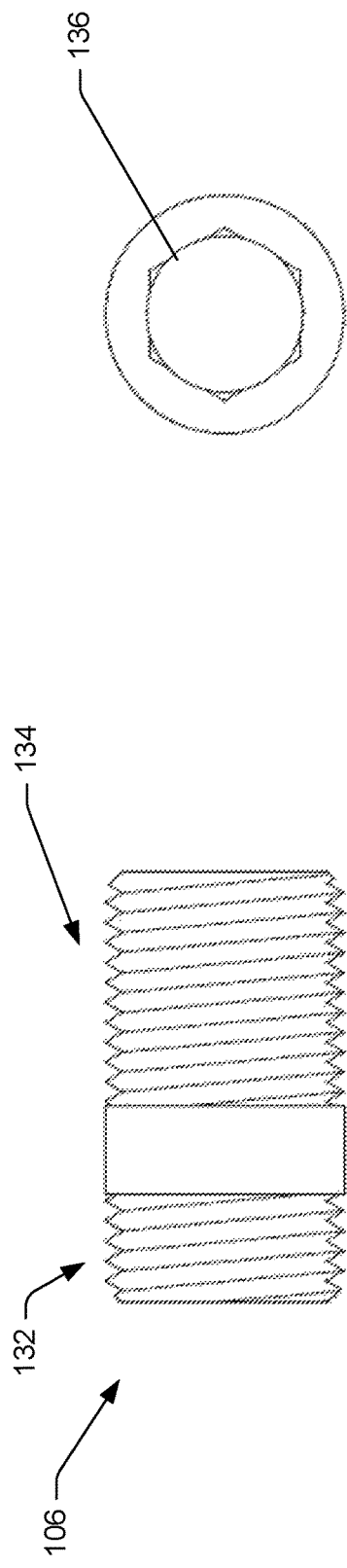
FIG. 3A
FIG. 3B
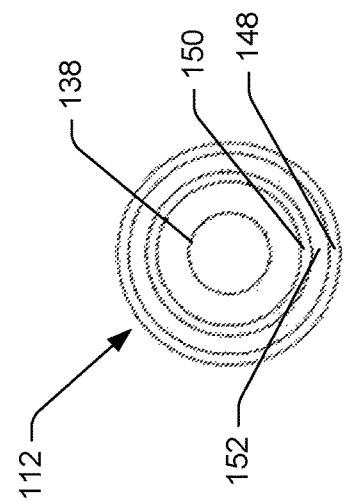
FIG. 3E
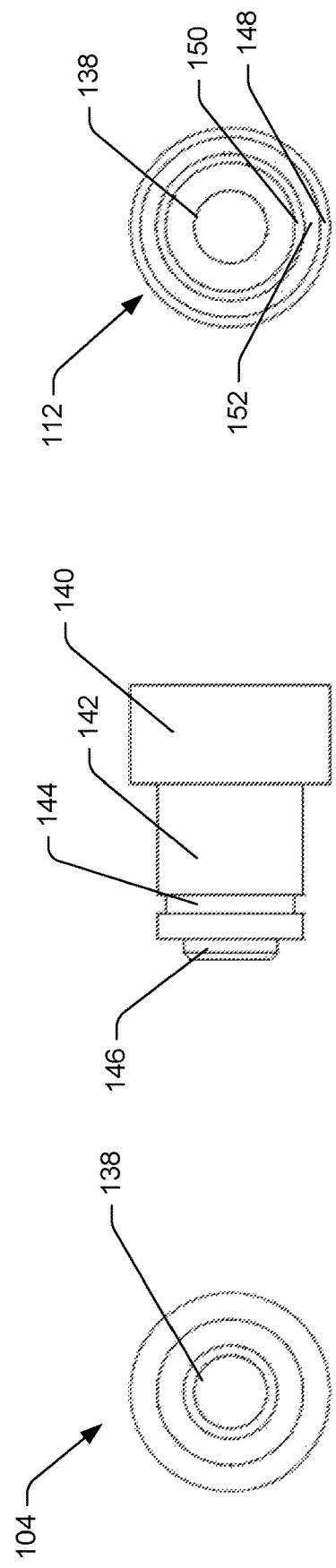
FIG. 3D
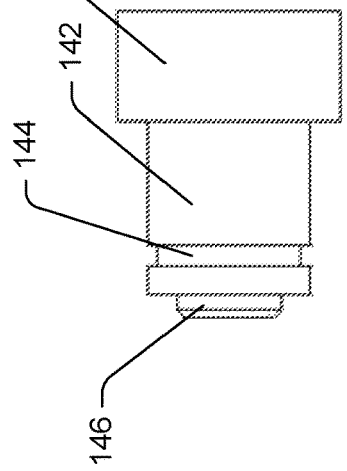
FIG. 3C

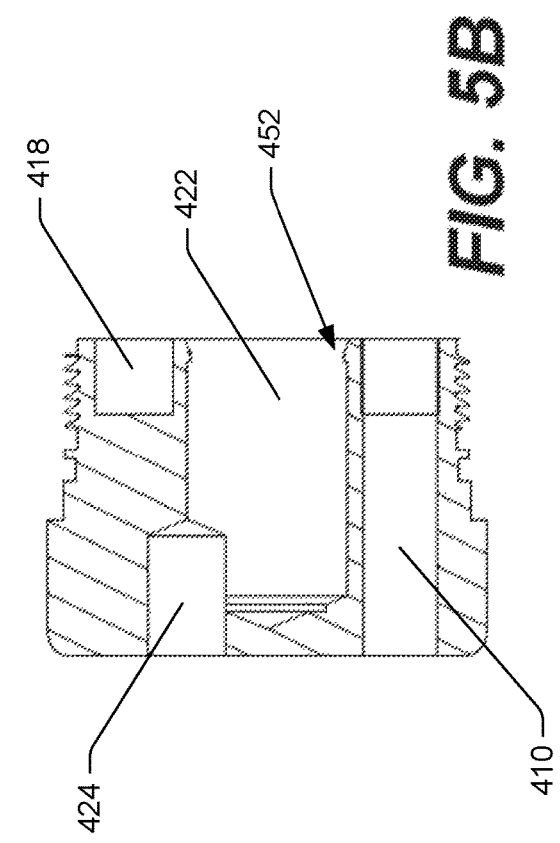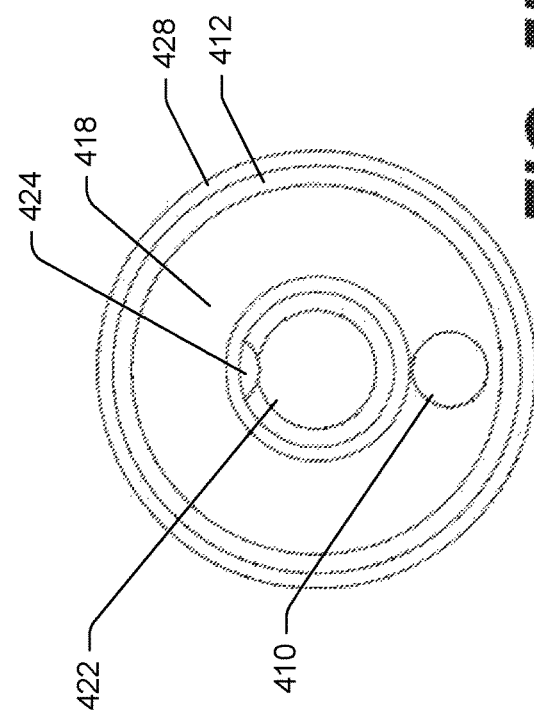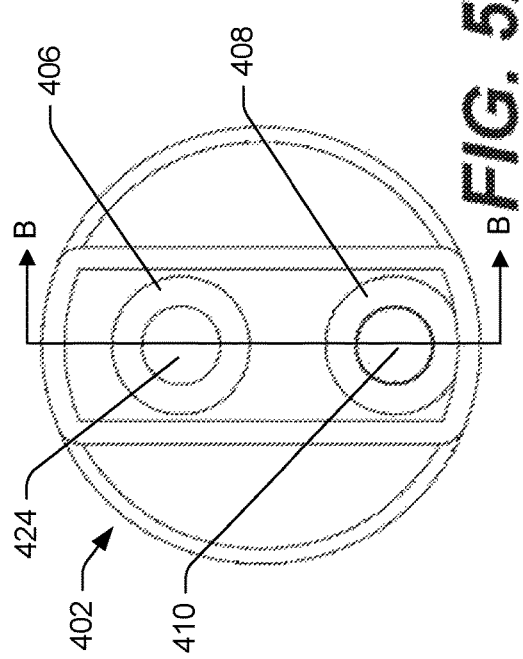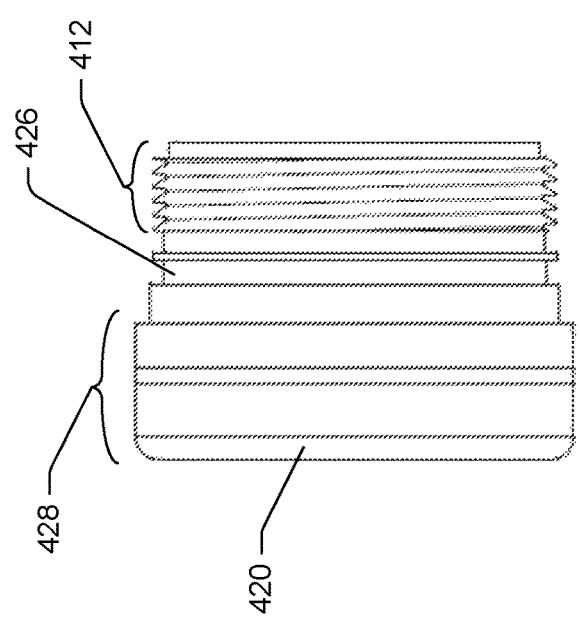

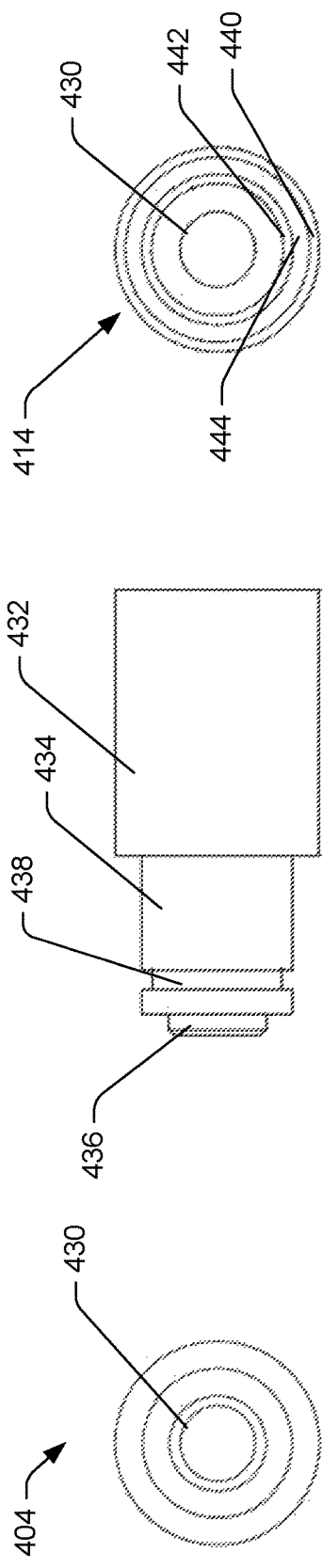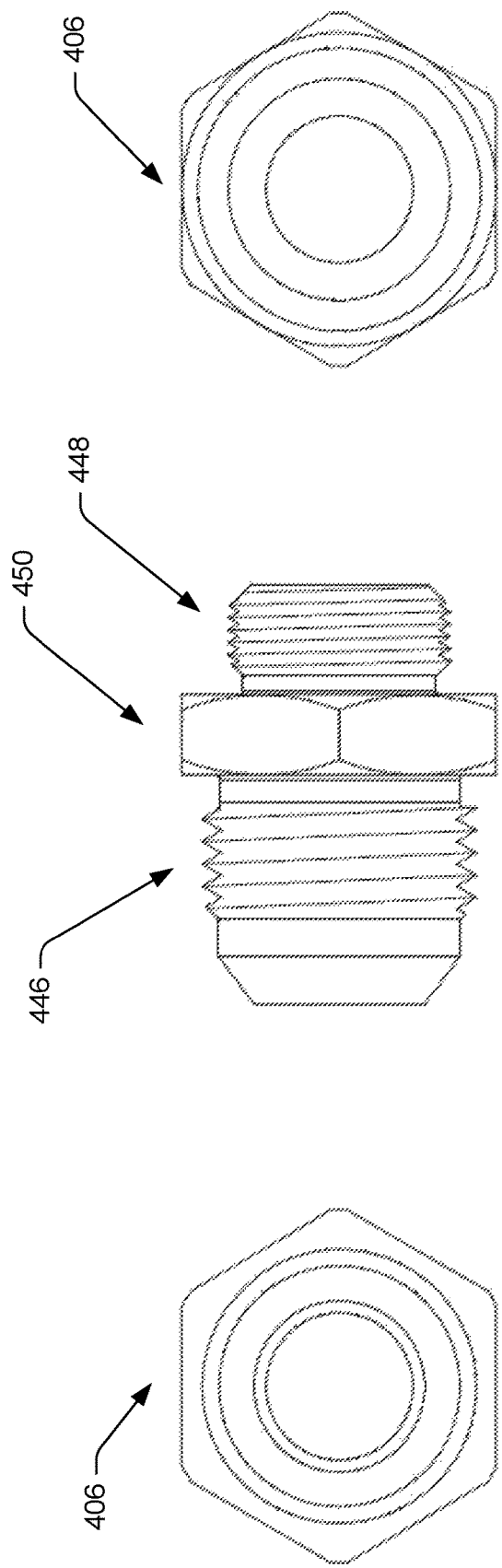

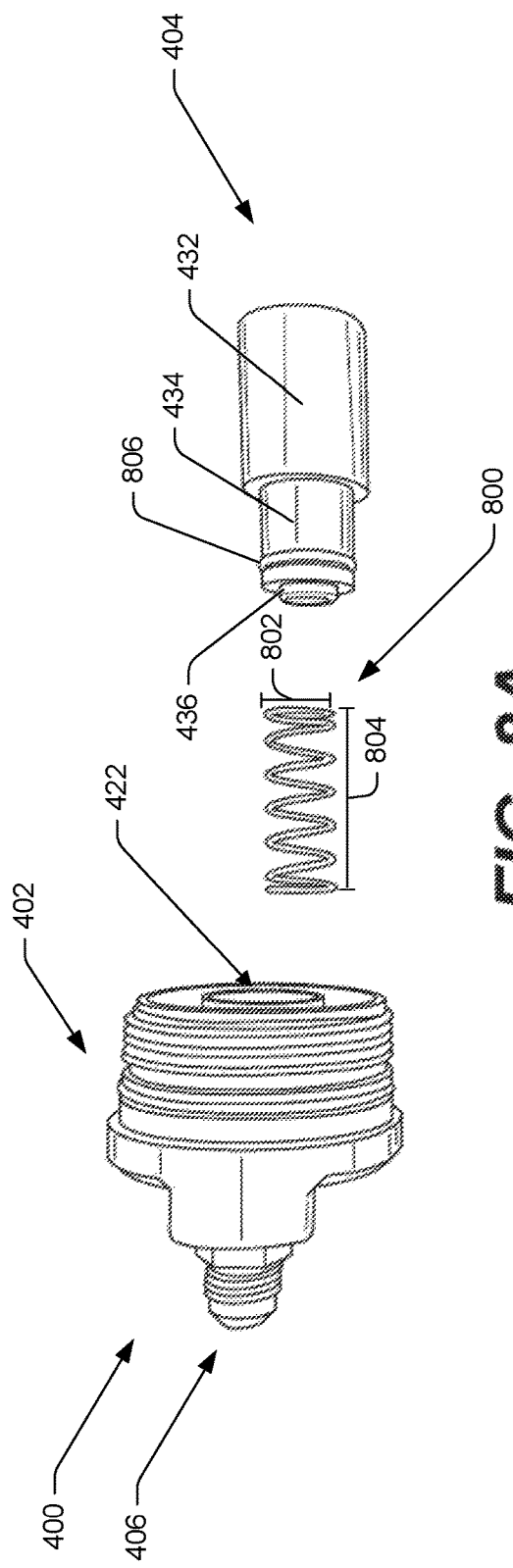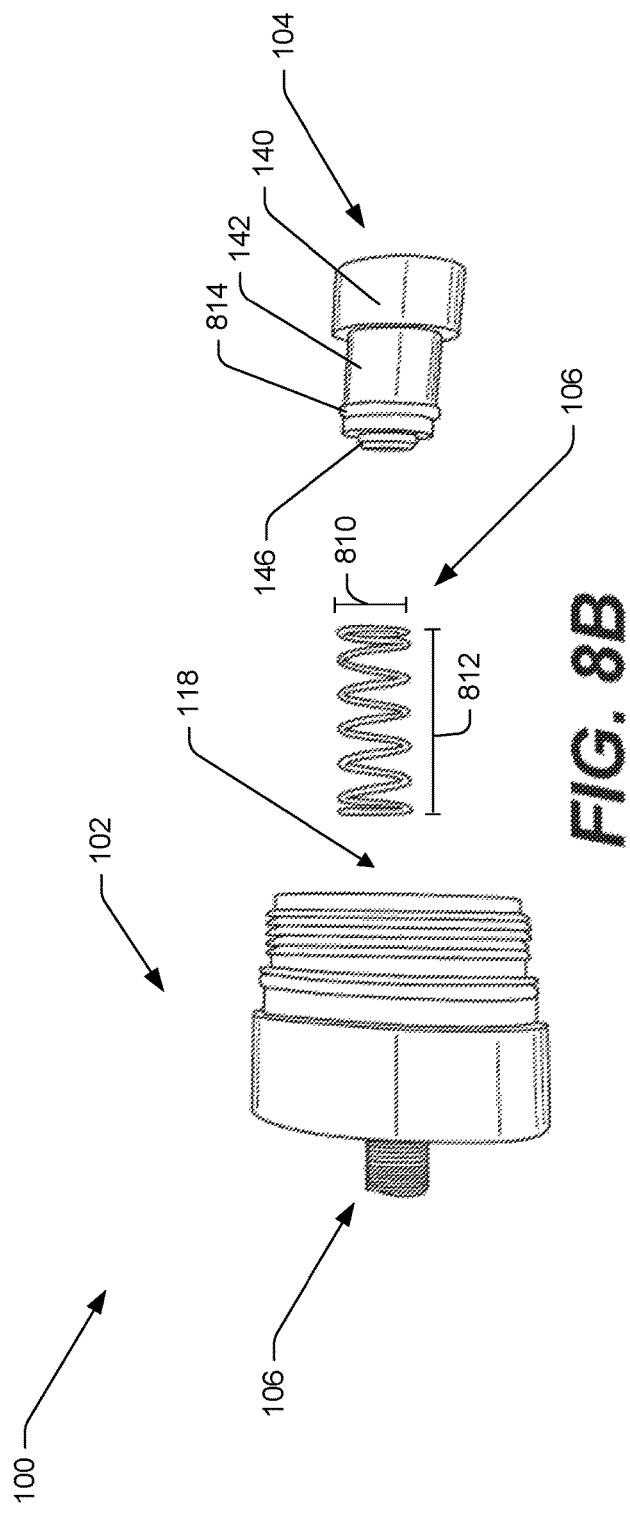

OIL FILTER ADAPTER

RELATED APPLICATIONS

This application is a continuation of and claims priority to U.S. patent application Ser. No. 15/186,218, filed on Jun. 17, 2016, which has issued as U.S. Pat. No. 10,195,553 and is incorporated by reference herein in its entirety.

BACKGROUND

Vehicles and machinery use oil filters to remove contaminants from engine oil, transmission oil, or lubricating oil. There are two main types of oil filters used for this purpose, cartridge oil filters and spin-on oil filters. Many vehicles and machinery are manufactured to use cartridge oil filters. However, consumers may find spin-on oil filters easier and less messy to replace. Additionally, the oil filter housing in vehicles may vary in size, even between two vehicles of the same make and model. Thus, there is a need for an oil filter adapter device that can fit a variety of oil filter housing sizes and can enable use of use spin-on oil filters for systems that were originally designed to use cartridge oil filters.

BRIEF DESCRIPTION OF THE DRAWINGS

The detailed description is set forth with reference to the accompanying figures. The use of the same reference numbers in different figures indicates similar or identical items.

FIG. 2A illustrates a bottom view of a base of the example oil filter adapter of FIG. 1B.

FIG. 2B illustrates a cross section of the base of the example oil filter adapter of FIG. 1B taken along line B-B in FIG. 2A.

FIG. 2C illustrates a side view of the base of the example oil filter adapter of FIG. 1B.

FIG. 2D illustrates a top view of the base of the example oil filter adapter of FIG. 1B.

FIG. 3A illustrates a side view of an oil filter attachment of the example oil filter adapter of FIG. 1B.

FIG. 3B illustrates a top view of the oil filter attachment of the example oil filter adapter of FIG. 1B.

FIG. 3C illustrates a bottom view of a docking collar of the example oil filter adapter of FIG. 1B.

FIG. 3D illustrates a side view of the docking collar of the example oil filter adapter of FIG. 1B.

FIG. 3E illustrates a top view of the docking collar of the example oil filter adapter of FIG. 1B.

FIG. 5A illustrates a bottom view of a base of the example oil filter adapter of FIG. 4B.

FIG. 5B illustrates a cross section of the base of the example oil filter adapter of FIG. 4B taken along line B-B in FIG. 5A.

FIG. 5C illustrates a side view of the base of the example oil filter adapter of FIG. 4B.

FIG. 5D illustrates a top view of the base of the example oil filter adapter of FIG. 4B.

FIG. 6A illustrates a bottom view of a docking collar of the example oil filter adapter of FIG. 4B.

FIG. 6B illustrates a side view of the docking collar of the example oil filter adapter of FIG. 4B.

FIG. 6C illustrates a top view of the docking collar of the example oil filter adapter of FIG. 4B.

FIG. 6D illustrates a top view of the oil filter attachment of the example oil filter adapter of FIG. 4B.

FIG. 6E illustrates a side view of an oil filter attachment of the example oil filter adapter of FIG. 4B.

FIG. 6F illustrates a bottom view of the oil filter attachment of the example oil filter adapter of FIG. 4B.

FIG. 8A illustrates an exploded view of the example oil filter adapter of FIG. 4B.

FIG. 8B illustrates an exploded view of the example oil filter adapter of 1B.

DETAILED DESCRIPTION

Overview

Figure 1A:
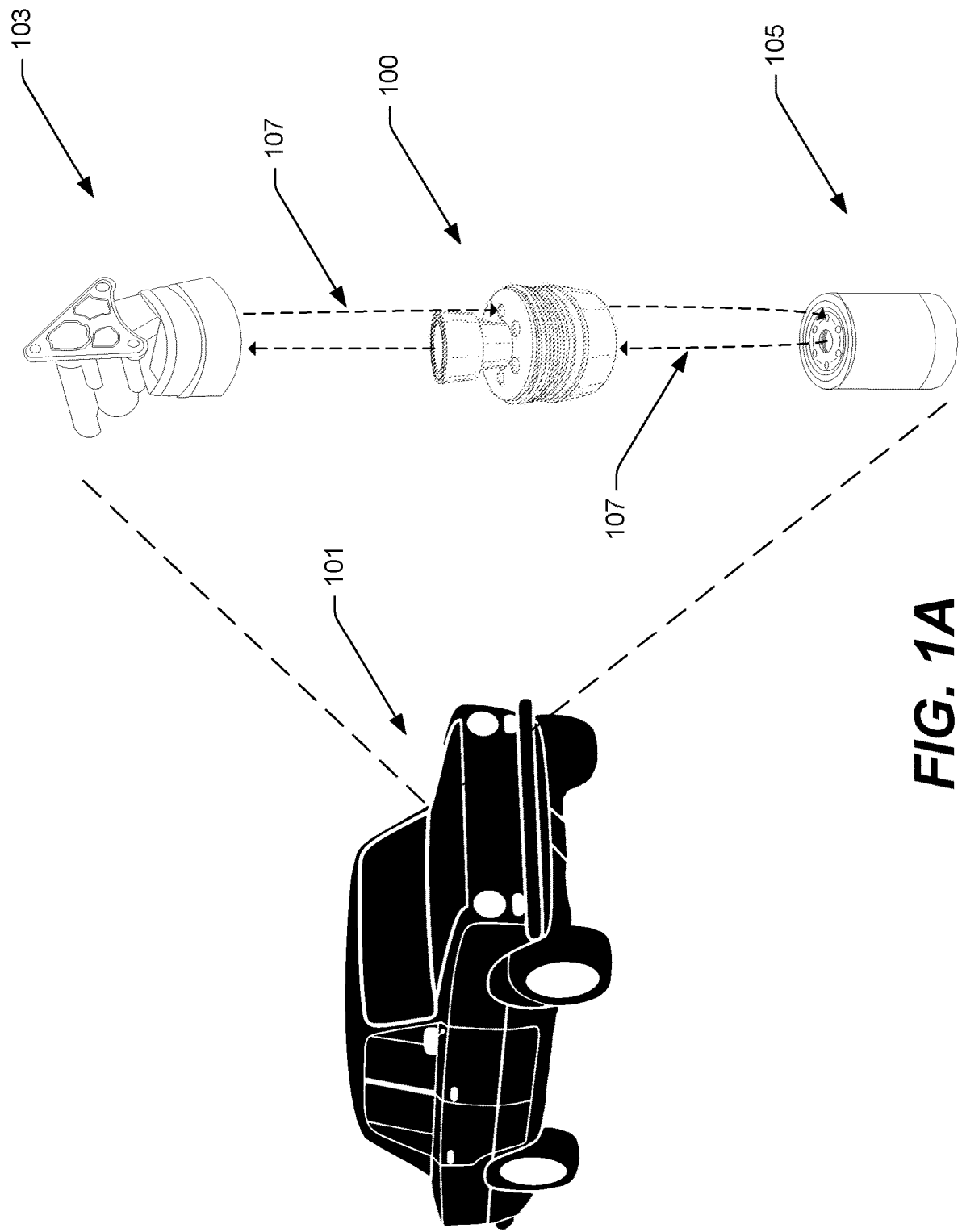
FIG. 1A is a schematic view showing an example oil filter adapter adapting a vehicle to use a spin-on oil filter.

As discussed above, there are two main types of oil filters used in vehicles and machinery today, namely cartridge oil filters and spin-on oil filters. Many vehicles and machinery are manufactured to use cartridge oil filters. Cartridge oil filters may be difficult to access because they are located within an oil filter housing and are usually covered in dirty oil, making them difficult to replace cleanly. Spin-on oil filters are typically easier to access when replacing because they are attached to the exterior of an oil filter housing, and are much cleaner because there is no need to actually touch the filter cartridge within the spin-on cap. Furthermore, the oil filter housing may vary in size between vehicles, even between vehicles of the same make and model. It is imperative that an oil filter adapter make a proper seal with the oil filter housing, or else oil will leak which may cause extensive damage to the engine.

This application describes an oil filter adapter that can be used in an engine to enable an oil filter system that is designed for using cartridge oil filters to use spin-on oil filters. The oil filter adapter may be configured to attach to an oil filter housing of a vehicle, form a seal with the oil filter housing, and have an attachment for a spin-on oil filter. The oil filter adapter may have a first end that attaches to an oil filter housing and a second end that attaches to a spin-on oil filter. The spin-on oil filter may be attached directly to the attachment of the oil filter adapter or the spin-on oil filter may be located remotely from the oil filter adapter and be attached via hoses and an additional filter mount. As an example of an oil filter adapter with a spin-on oil filter attached directly to the oil filter adapter, the oil filter adapter may have a cylindrical base with threads that allow the base to couple to the oil filter housing of a vehicle or other machine. The oil filter adapter may also have a docking collar that is attached to the base at one end of the docking collar and forms a seal with an oil passage of the oil filter housing on another end of the docking collar. The base may have a threaded attachment piece on an opposite end of the docking collar for attachment to a spin-on oil filter. When the docking collar, cylindrical base, and attachment piece are all coupled together, they may form a passage for filtered oil and be capable of attaching to an oil filter housing to receive unfiltered oil from an engine. For instance, when the oil filter adapter is attached to the oil filter housing of the engine, unfiltered oil may travel through an unfiltered oil passage of the cylindrical base and into a spin-on oil filter. After the oil is filtered, the oil may travel through the oil filter attachment piece, the filtered oil passage of the cylindrical base, and through the docking collar to be distributed through the engine.

In some embodiments, the base may have a cylindrical recess sized to fit a part of the docking collar. The recess may have two opposite ends. The first end may have a chamfered edge and the second end may have a smaller diameter than the rest of the recess. The recess may also contain a spring that has a smaller diameter than the first end of the recess and a larger diameter than the second end of the recess so that the spring can be inserted and retained by the recess. The spring may be placed between the second end of the recess and the docking collar. The docking collar may have a retainer that has a smaller diameter than the diameter of the recess and a larger diameter than a diameter of the chamfered edge. The spring may have a length that is longer than a length of the recess when there is no force being exerted on the spring. Thus, when the docking collar is coupled to the base and a force is exerted on the docking collar toward the base, the spring may compress allowing the docking collar to travel a distance into the recess. When no downward force is exerted on the docking collar, the spring may exert an upward force on the docking collar allowing the docking collar to travel a distance out of the recess. The retainer of the docking collar and the chamfered edge of the recess retain the docking collar and prevent it from detaching completely from the base. The movable docking collar enables the oil filter adapter to attach to oil filter housings having a variety of different sizes and dimensions. For instance, the docking collar is compressible into the base to accommodate different distances between the oil filter adapter and a sealing surface around an oil passage of the engine. The compressible docking collar allows the top face of the docking collar to make a seal with the sealing surface around the oil passage of the engine.

The base may also have one or more passages for allowing oil to travel from the oil filter housing into an attached spin-on oil filter. For instance, there may be a passage between the recess and an edge of the base that extends through the base between a first end (proximate the engine) and a second end (proximate the spin-on oil filter). In the illustrated example, there are six passages. However, in other examples, there may be any number of one or more separate passages. Once the oil is filtered in the spin-on oil filter, the oil may travel through the spin-on oil attachment piece, base recess, and docking collar to be distributed into the engine. For instance, the base may be cylindrical and have a recess for filtered oil located in the center of the base, the base may also have a passage, or a plurality of passages, located between the recess and an edge of the base. In some instances, the first end of the base that attaches to the oil filter housing may have a flush surface, so that the recess for filtered oil and the passage, or plurality of passages, extends to the same plane. In some instances, the recess for filtered oil and the edge of the base may extend beyond the passage, or plurality of passages, creating a well or reservoir below the top most surface of the base. When the docking collar is fully compressed, the well provides additional volume for unfiltered oil to collect before passing through the passage and into the spin-on oil filter.

In other examples, the oil filter adapter may have multiple attachment pieces that allow the oil filter adapter to indirectly attach to a spin-on oil filter. For instance, the oil filter adapter may have an oil in attachment and an oil out attachment. The oil out attachment may connect to a hose that transports unfiltered oil to an oil filter located in a different location than the oil filter adapter. The oil in attachment may connect to a different hose that transports filtered oil from the oil filter back to the oil filter adapter. This is useful in situation where the oil filter housing of an engine is in a hard to reach area. In addition to the ability to relocate an oil filter using a remote mount, the oil filter adapter provides the ability to add other oil system components to an oil system. For instance, the oil filter adapter may provide the ability to attach coolers, accumulators, and the like, to an oil system.

The docking collar and base may be comprised of a variety of different metals, plastics, and/or ceramics. In some examples, the docking collar may be comprised of billet aluminum, stainless steel, or a combination thereof. Additionally the docking collar may be anodized to aid in the process of cleaning and to prevent corrosion and pitting. Each part may be machined or cast, for example. The seals may comprise O-rings made of rubber, silicone, or other materials that are resistant to the oil to be filtered. In other examples, the base and/or docking collar may be comprised of plastic and may be formed by, for example, injection molding. While the following examples of the oil filter adapter are shown as being cylindrical, in other examples, the oil filter adapters can be other shapes (e.g. having other geometries such as rectangular, hexagonal, octagonal, triangular, pentagonal, oval, diamond, heptagonal, octagonal, nonagonal, decagonal, etc.).

Example Oil Filter Adapter

Turning now to the figures, details are provided concerning various example embodiments. In general, the embodiments disclosed in the figures are presented by way of example. The components disclosed in the figures may be combined as desired to create an oil filter adapter having various configurations. The components disclosed in the figures may be rearranged, modified, duplicated, and/or omitted in some configurations.

With reference to FIG. 1A, an example embodiment of an oil filter adapter 100 is illustrated adapting a vehicle to use a spin-on oil filter. The system in FIG. 1A illustrates an engine 101, an oil filter housing 103, an oil filter adapter 100, and a spin-on oil filter 105. Broken lines 107 illustrate a flow of oil that travels between the oil filter housing 103, the oil filter adapter 100, and the spin-on oil filter 105. For instance, the flow of oil from the oil filter housing 103 to the oil filter adapter 100 and into the spin-on oil filter 105 may be unfiltered oil. The flow from the spin-on oil filter 105 to the oil filter adapter 100 and back to the oil filter housing 103 may be filtered oil for distribution into engine 101.

Figure 1C:
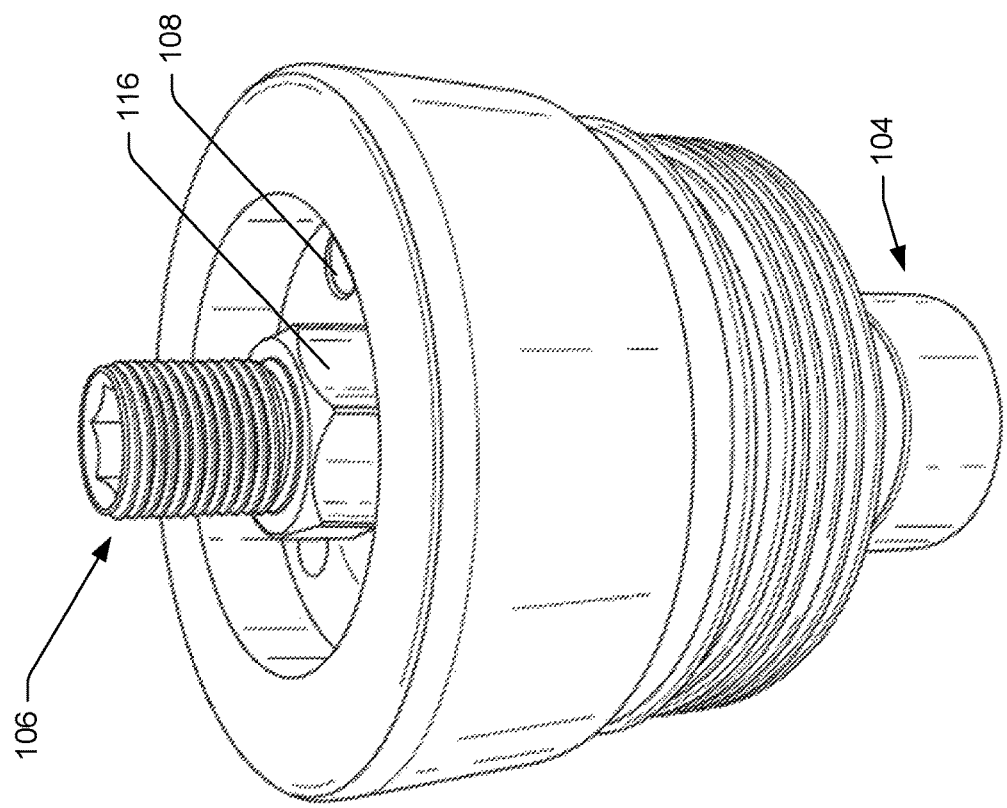
FIG. 1C illustrates a perspective view of the example oil filter adapter of FIG. 1B viewed from below.
Figure 1B:
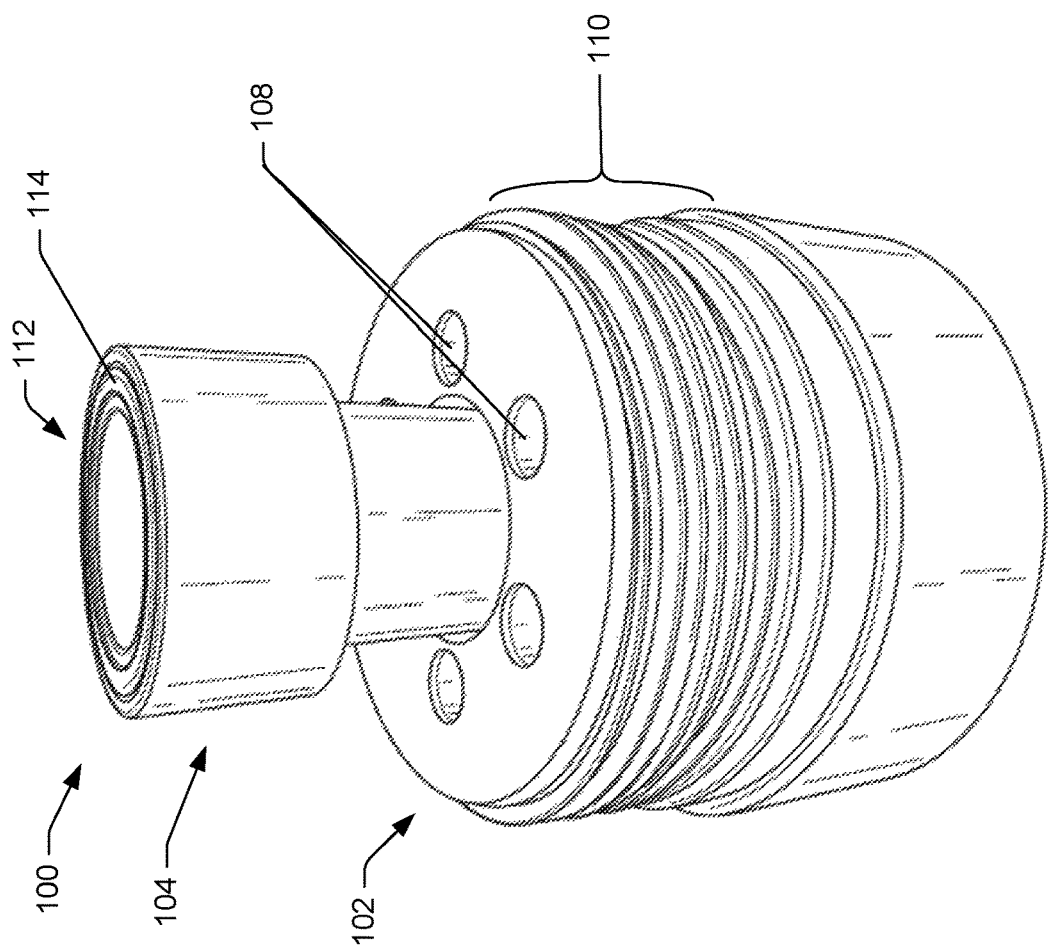
FIG. 1B illustrates a perspective view of an example oil filter adapter viewed from above.

With reference to FIG. 1B and FIG. 1C, an example embodiment of an oil filter adapter 100 is illustrated that includes a base 102, a docking collar 104, and an oil filter attachment 106. Base 102 may include a plurality of passages 108 used for transporting unfiltered oil from an engine to an oil filter. Base 102 may also include threads 110 used to couple with an engine. For instance, threads 110 may attach to an oil filter housing that is attached to an engine. Docking collar 104 may have a face 112 with a seal 114. Seal 114 may be used to couple with an internal part of an engine and/or an oil filter housing within an engine. Seal 114 may comprise of a rubber O-ring. As illustrated in FIG. 1C, oil filter adapter 100 may have an oil filter attachment 106. Oil filter attachment 106 may be detachable from base 102. Base 102 may also have a nut 116 used to secure or tighten the base 102 to the engine.

Figure 1D:
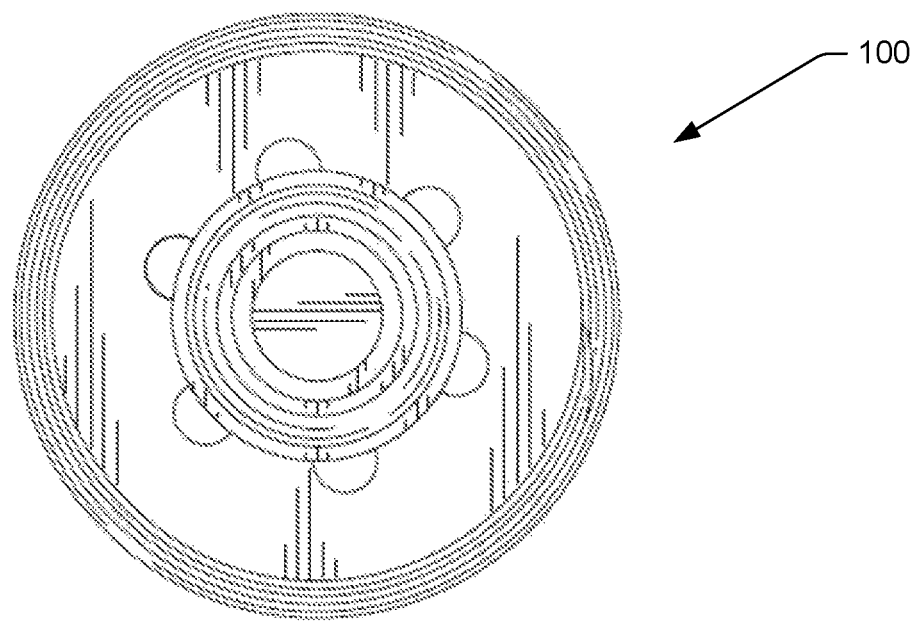
FIG. 1D illustrates a top view of the example oil filter adapter of FIG. 1B.
Figure 1E:
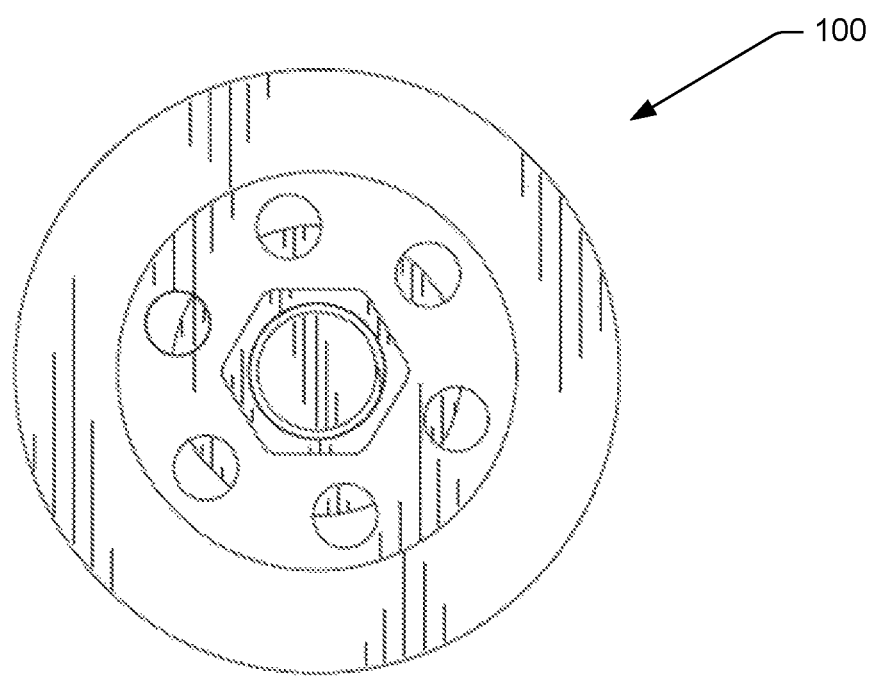
FIG. 1E illustrates a bottom view of the example oil filter adapter of FIG. 1B.
Figure 1F:
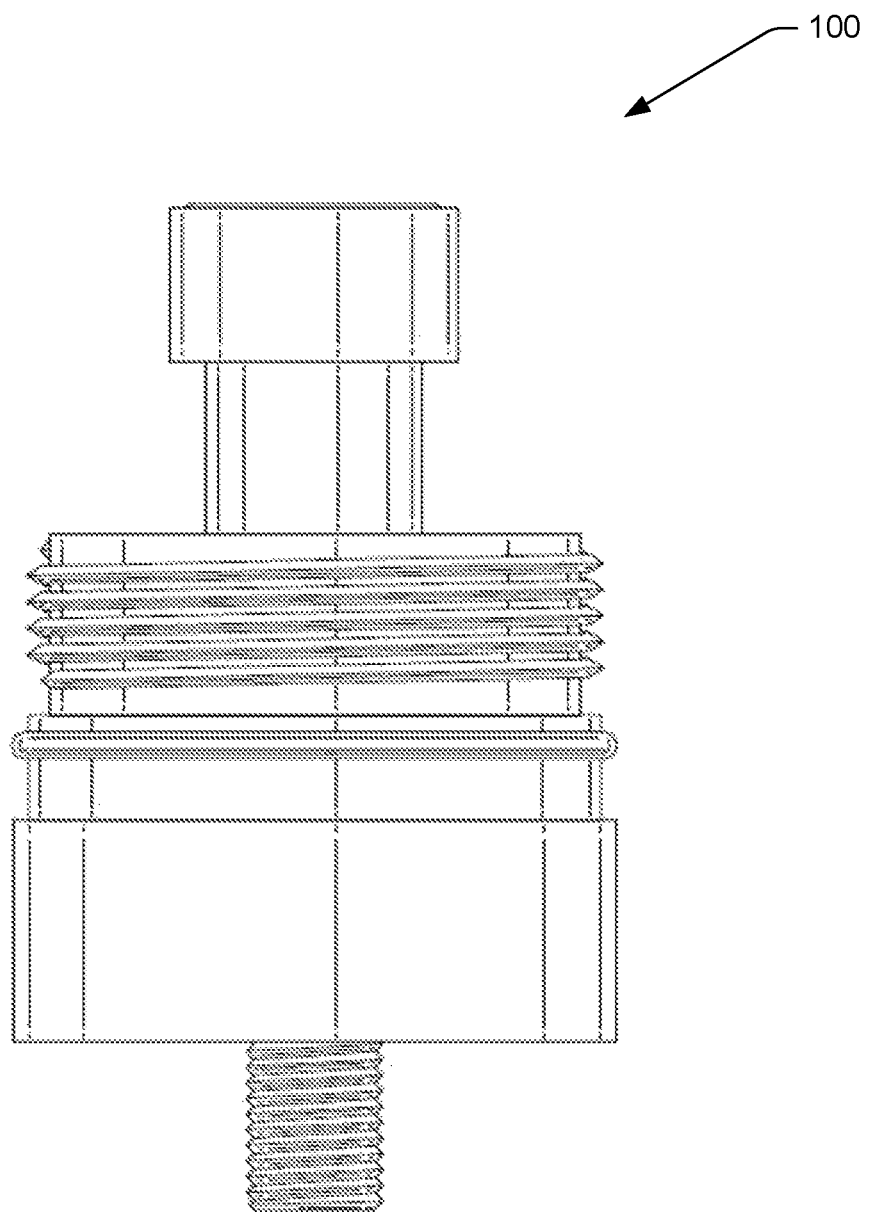
FIG. 1F illustrates a front view of the example oil filter adapter of FIG. 1B, the back and side views of the example oil filter being identical to the front view.

With reference to FIGS. 1D-1F, oil filter adapter 100 is illustrated to display various points of view. For instance, FIG. 1D illustrates a top view of oil filter adapter 100. FIG. 1E illustrates a bottom view of oil filter adapter 100. FIG. 1F illustrates a front view of oil filter adapter 100.

One embodiment of base 102 is illustrated in greater detail in FIGS. 2A-2D. FIG. 2A illustrates a bottom view of base 102, which may include oil filter attachment 106, passages 108, and nut 116. FIG. 2B illustrates a side cross-sectional view of base 102. FIG. 2B includes passages 108 and recess 118. Recess 118 may be sized to receive docking collar 104. Recess 118 may also include chamfered edge 120, and may have a diameter 122. The bottom of recess 118 may have a smaller diameter than the middle of recess 118. For instance, diameter 122 may be greater than diameter 124, which may be greater than diameter 126. FIG. 2C illustrates a side view of base 102. Base 102 may include threads 110 and a recessed portion 128 for retaining a sealing mechanism, such as a rubber O-ring. Additionally, bottom portion 130 of base 102 may have a larger diameter than threaded portion 110. FIG. 2D illustrates a top view of base 102, which may include bottom portion 130, threaded portion 110, passages 108, recess 118. Additionally, the top view illustrates the narrowing of recess 118 in diameters 124 and 126.

One embodiment of oil filter attachment 106 is illustrated in greater detail in FIGS. 3A and 3B. FIG. 3A illustrates a side view of oil filter attachment 106 with a threaded end 132 and a threaded end 134. End 134 may have more threads and be longer than end 132. Additionally, end 134 may be used to attach to an oil filter, and end 132 may be used to attach to base 102. FIG. 3B illustrates a bottom view of end 134 of oil filter attachment 106 and may have a passage 136 for transporting filtered oil from the oil filter to the oil filter adapter. Additionally passage may be shaped to receive a wrench.

One embodiment of docking collar 104 is illustrated in greater detail in FIGS. 3C-3E. FIG. 3C illustrates a bottom view of docking collar 104 with a passage 138. FIG. 3D illustrates a side view of docking collar 104, which may include a top portion 140, a middle portion 142, and a bottom portion 146. Additionally, there may be a recess 144 towards the bottom of middle portion 142 sized to couple with a retainer. The retainer may also act as a seal. The retainer may be a rubber O-ring. As illustrated in FIG. 3D, top portion 140 may have a larger diameter than middle portion 142, which may have a larger diameter than bottom portion 146. Middle portion 142 may be sized to fit inside recess 118 of base 102. FIG. 3E illustrates a top view of docking collar 104. As illustrated in FIG. 3E, docking collar 106 may have a face 112 for coupling to an engine and/or an oil filter housing. Face 112 may have an outer wall 148 and an inner wall 150, forming recess 152. Recess 152 may be sized to contain a sealing mechanism, such as seal 114.

Figure 4A:
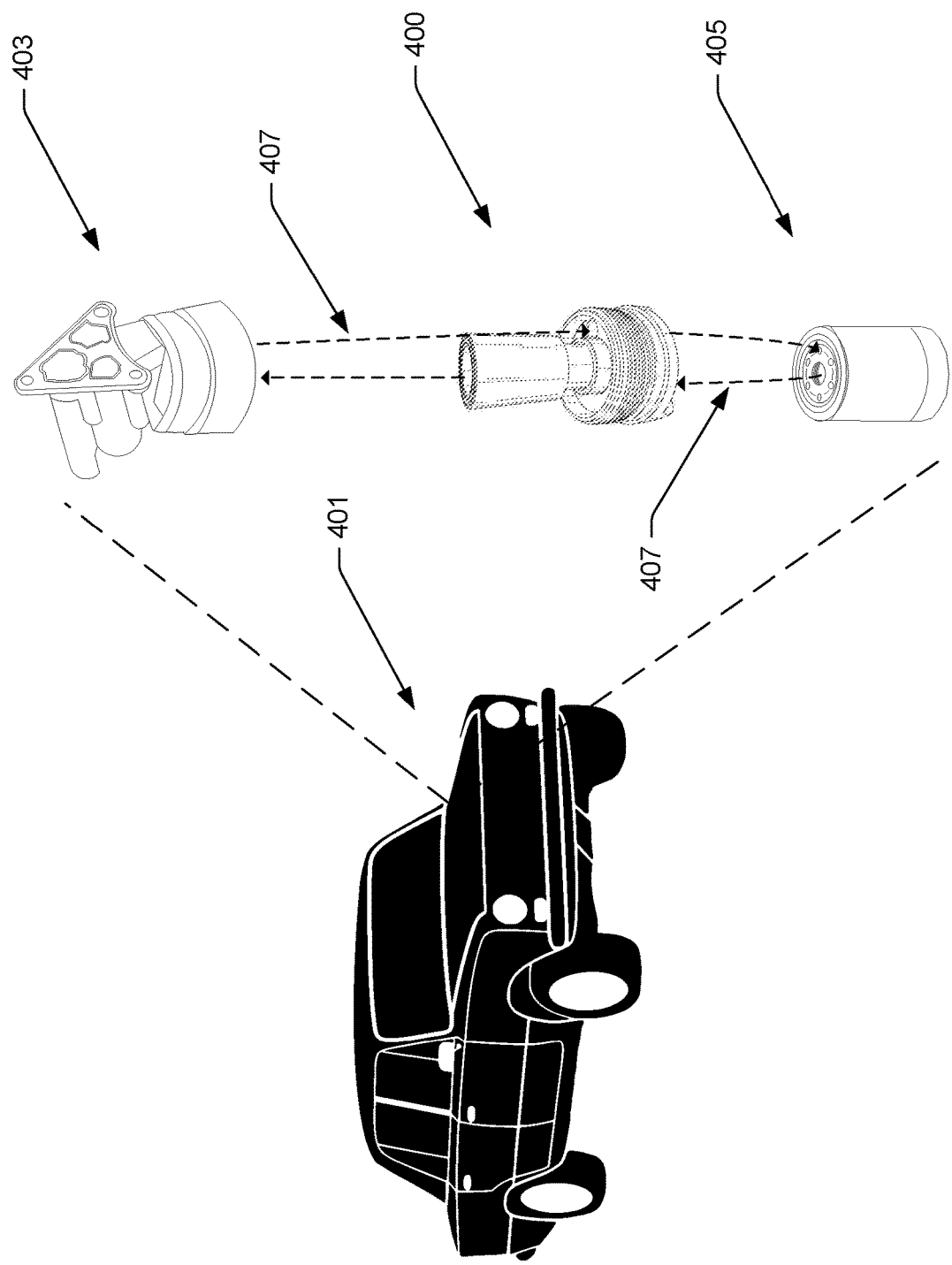
FIG. 4A is a schematic view showing an example oil filter adapter adapting a vehicle to use a spin-on oil filter.

With reference to FIG. 4A, an example embodiment of an oil filter adapter 400 is illustrated adapting a vehicle to use a spin-on oil filter. The system in FIG. 4A illustrates an engine 401, an oil filter housing 403, an oil filter adapter 400, and a spin-on oil filter 405. Broken lines 407 illustrate a flow of oil that travels between the oil filter housing 403, the oil filter adapter 400, and the spin-on oil filter 405. For instance, the flow of oil from the oil filter housing 403 to the oil filter adapter 400 and into the spin-on oil filter 405 may be unfiltered oil. The flow from the spin-on oil filter 405 to the oil filter adapter 400 and back to the oil filter housing 403 may be filtered oil for distribution into engine 401.

Figure 4C:
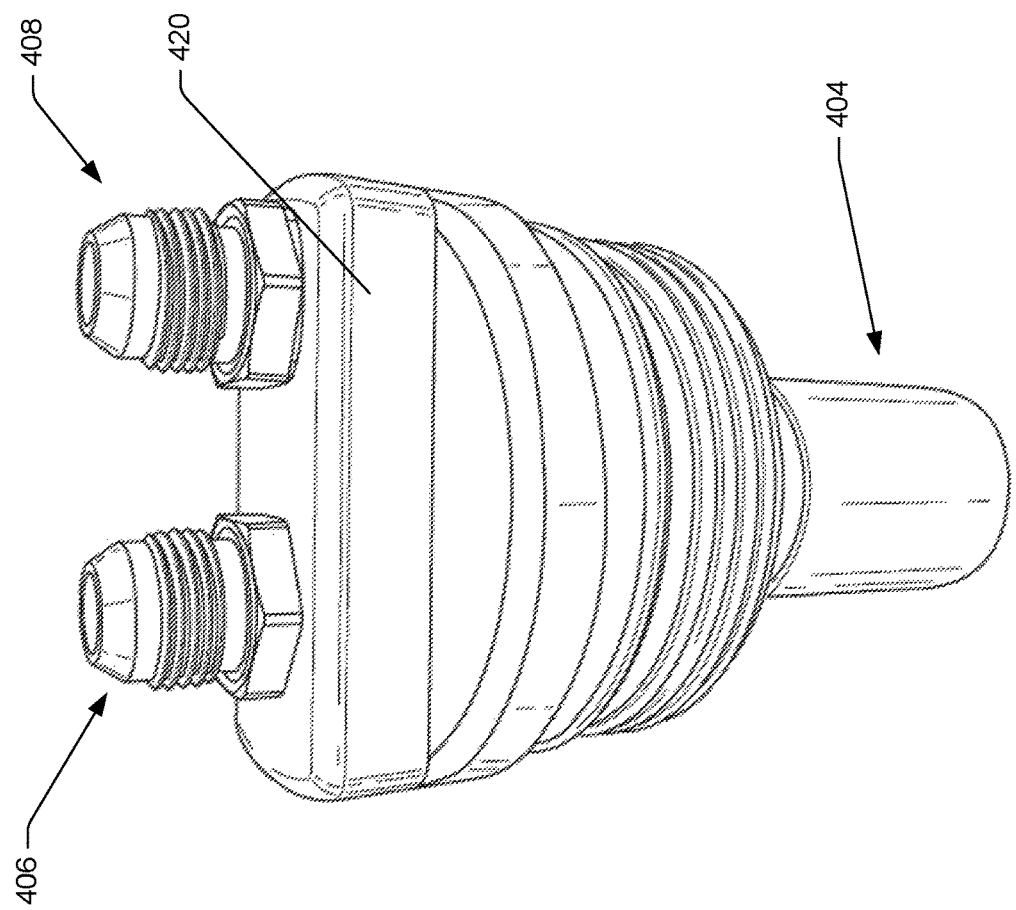
FIG. 4C illustrates a perspective view of the example oil filter adapter of FIG. 4B viewed from below.
Figure 4B:
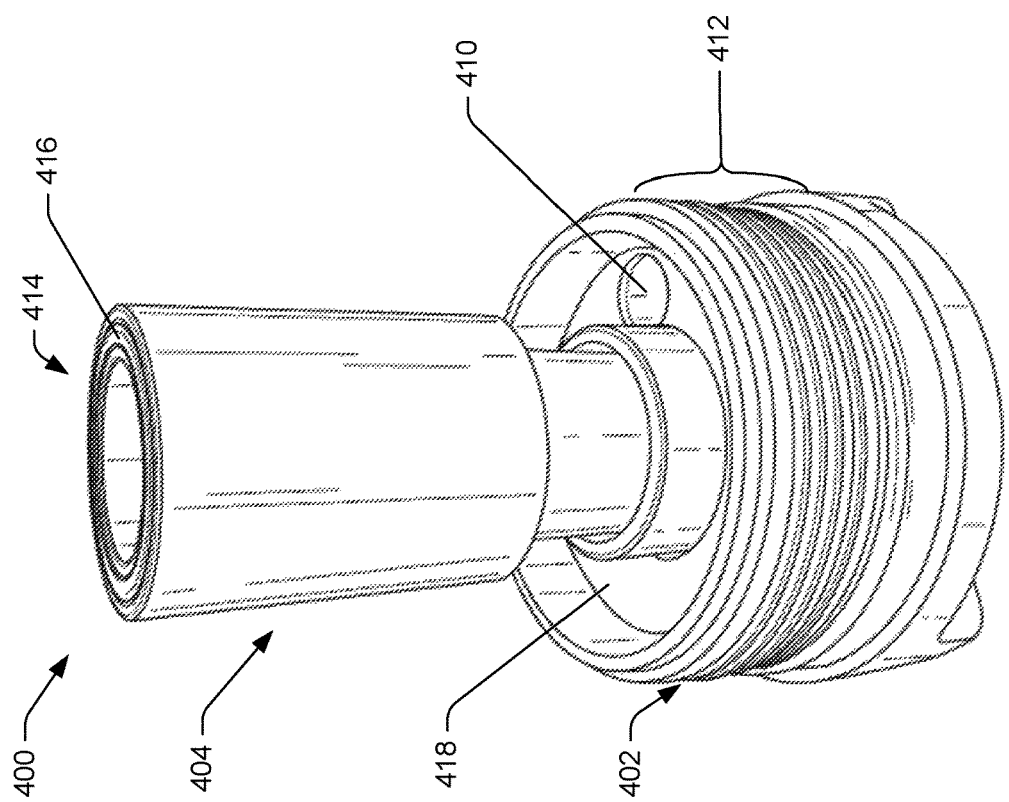
FIG. 4B illustrates a perspective view of another example oil filter adapter viewed above.

With reference to FIGS. 4B and 4C, an example embodiment of an oil filter adapter 400 is illustrated that includes base 402, a docking collar 404, and oil filter attachments 406 and 408. Base 404 may include a passage 410 used for transporting unfiltered oil from an engine to an oil filter. Passage 410 may be located within a lowered portion 418 (i.e. reservoir or well) of the top portion of base 402. Base 402 may also include threads 412 used to couple with an engine. For instance, threads 412 may attach to an oil filter housing that is attached to an engine. Docking collar 404 may have a face 414 with a seal 416. Seal 416 may be used to couple with an internal part of an engine and/or an oil filter housing within an engine. Seal 416 may comprise of a rubber O-ring. As illustrated in FIG. 4B, oil filter adapter 400 may have oil filter attachments 406 and 408. Oil filter attachments 406 and 408 may be permanently attached or removably attached to base 402. The bottom portion of base 402 may have an extended portion 420 used to exert torque on the oil filter adapter 400 when coupling with an engine.

Figure 4D:
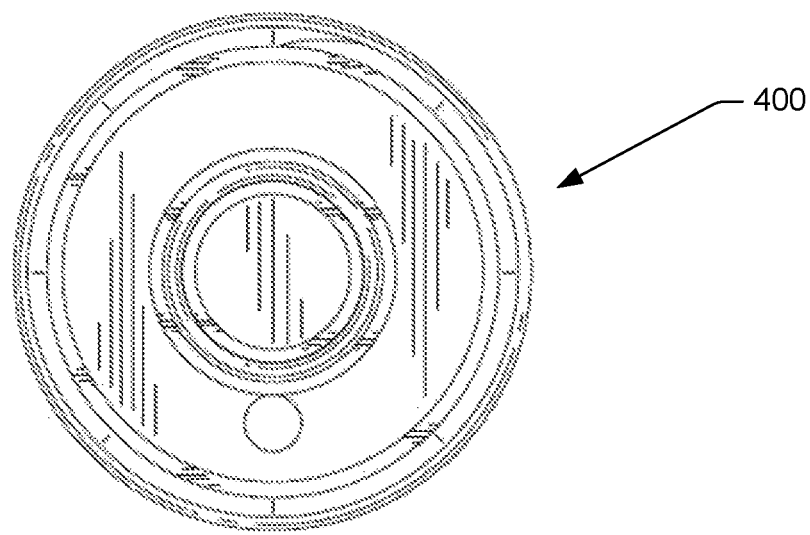
FIG. 4D illustrates a top view of the example oil filter adapter of FIG. 4B.
Figure 4E:
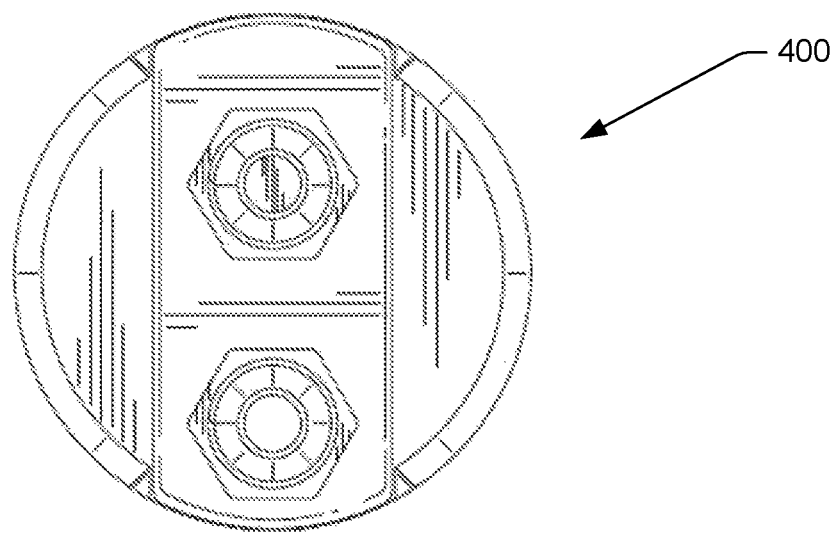
FIG. 4E illustrates a bottom view of the example oil filter adapter of FIG. 4B.
Figure 4F:
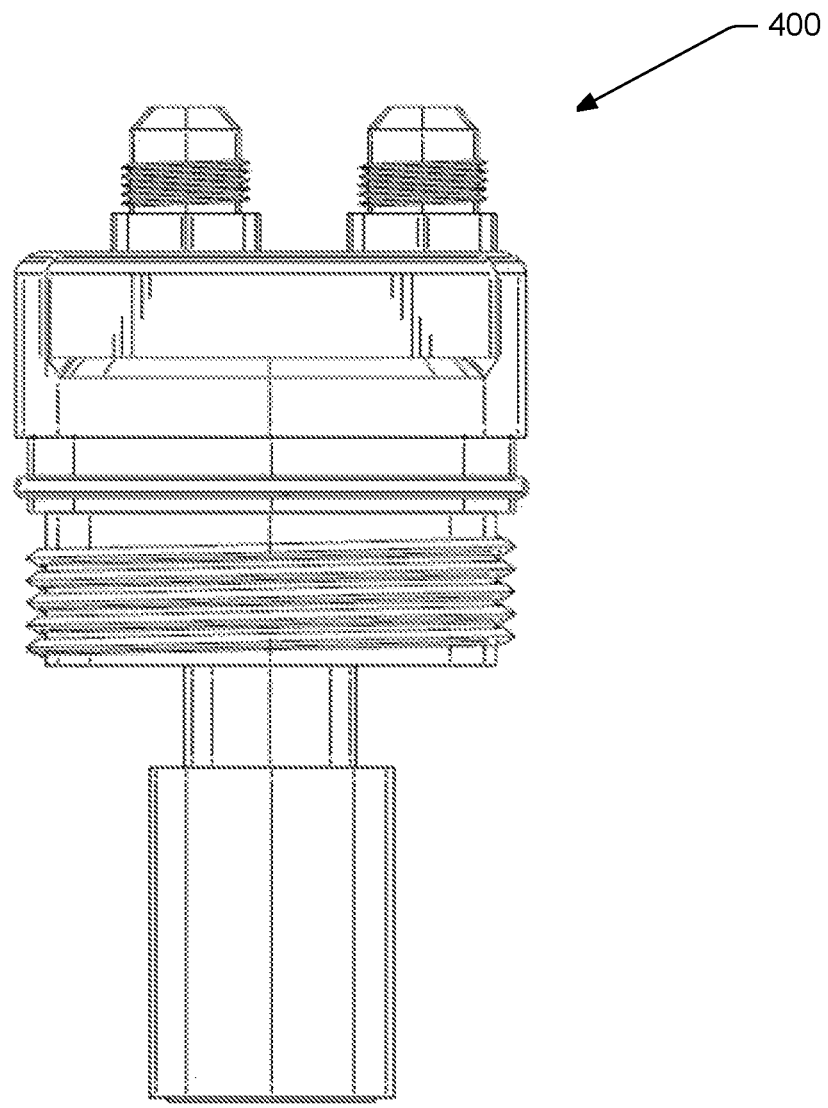
FIG. 4F illustrates a front view of the example oil filter adapter of FIG. 4B.
Figure 4G:
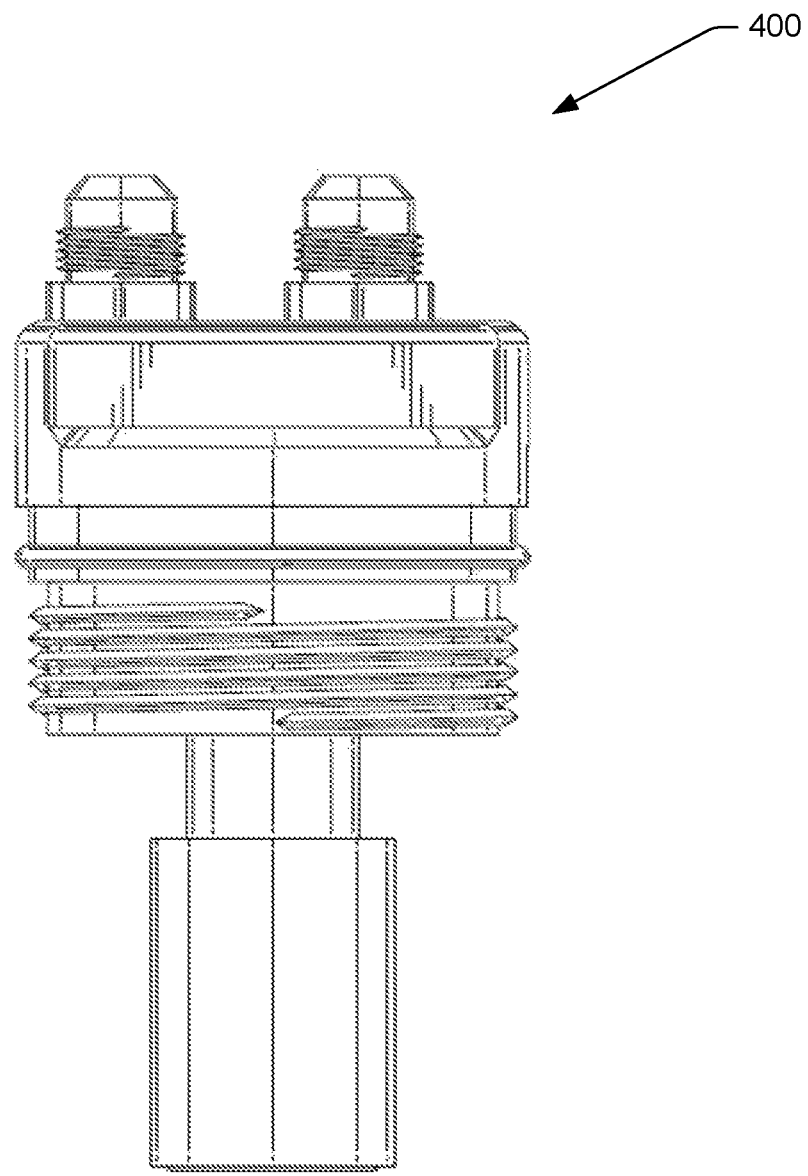
FIG. 4G illustrates a back view of the example oil filter adapter of FIG. 4B
Figure 4H:
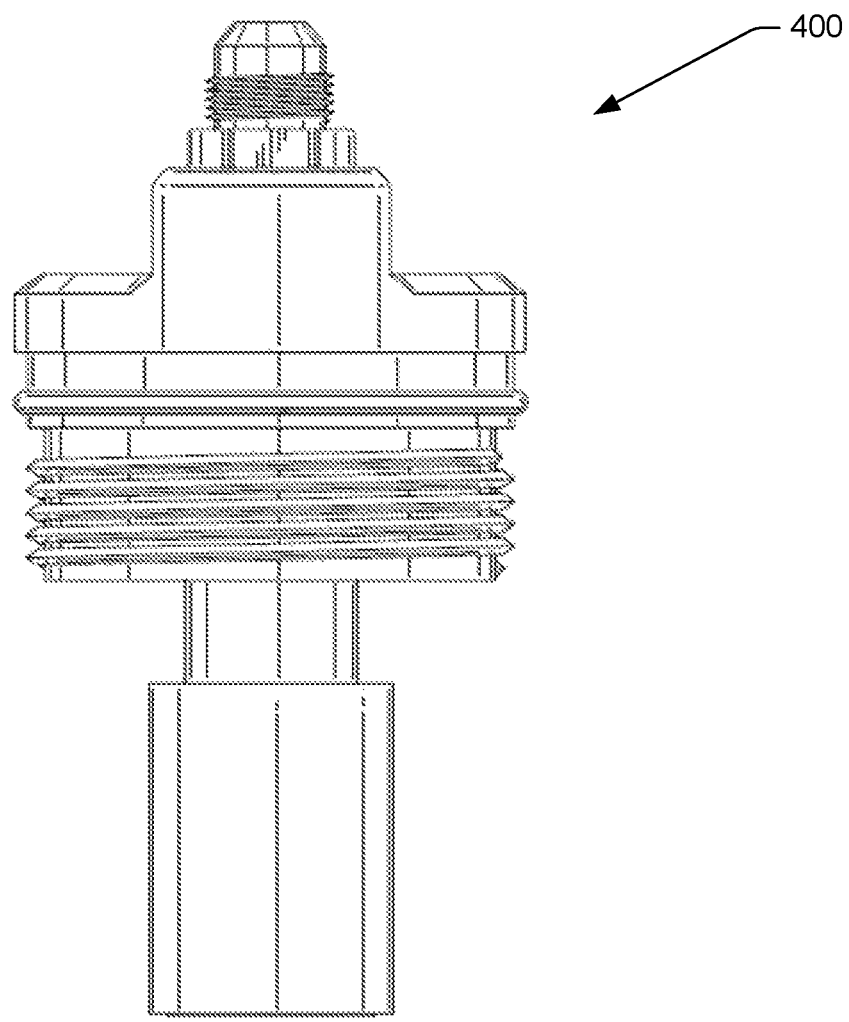
FIG. 4H illustrates a side view of the example oil filter adapter of FIG. 4B, the opposite side view being identical to the side view of FIG. 4H.

With reference to FIGS. 4D-4H, oil filter adapter 400 is illustrated to display various points of view. For instance, FIG. 4D illustrates a top view of oil filter adapter 400. FIG. 4E illustrates a bottom view of oil filter adapter 400. FIG. 4F illustrates a front view of oil filter adapter 400. FIG. 4G illustrates a back view of example oil filter adapter 400. FIG. 4H illustrates a side view of oil filter adapter 400.

One embodiment of base 402 is illustrated in greater detail in FIGS. 5A-5D. FIG. 5A illustrates a bottom view of base 402, which may include oil filter attachments 406 and 408, passage 410, and passage 424. Passage 410 may be used for unfiltered oil whereas passage 424 may be used for filtered oil. FIG. 5B illustrates a side cross-sectional view of base 402, which may include lowered portion 418, passage 410, and passage 424. Additionally, base 404 may include recess 422. Passage 424 and recess 422 may be connected to form a single passage for filtered oil. Base 404 may also include a chamfered edge 452. FIG. 5C illustrates a side view of base 402. Base 402 may include threads 110 and a recessed portion 426 for retaining a sealing mechanism, such as a rubber O-ring. Additionally, bottom portion 428 of base 402 may have a larger diameter than threaded portion 412. FIG. 5D illustrates a top view of base 402, which may include lower portion 428, threaded portion 412, lowered portion 418, recess 422, passage 410, and passage 424.

One embodiment of docking collar 404 is illustrated in greater detail in FIGS. 6A-6C. FIG. 6A illustrates a bottom view of docking collar 404 with passage 430. FIG. 6B illustrates a side view of docking collar 404 which may include a top portion 432, a middle portion 434, and a bottom portion 436. Additionally, there may be a recess 438 towards the bottom of middle portion 434 sized to couple with a retainer. The retainer may also act as a seal. The retainer may be a rubber O-ring. As illustrated in FIG. 6B, top portion 432 may have a larger diameter than middle portion 434, which may have a larger diameter than bottom portion 436. Middle portion 434 may be sized to fit inside recess 422 of base 402. FIG. 6C illustrates a top view of docking collar 404. As illustrated in FIG. 6C, docking collar 404 may have a face 414 for coupling to an engine and/or an oil filter housing. Face 414 may have an outer wall 440 and an inner wall 442, forming recess 444. Recess 444 may be sized to contain a sealing mechanism, such as seal 416.

One embodiment of oil filter attachment 406 is illustrated in greater detail in FIGS. 6D-6F. FIG. 6D show a bottom view of oil filter attachment 406. FIG. 6E shows a side view of oil filter attachment 406. Oil filter attachment 406 may have a longer end 446 and a shorter end 448 with a nut 450 in between the longer end and shorter end. Shorter end 448 may be used to couple with base 402 and longer end 446 may be used to couple with an oil filter. FIG. 6F shows a top view of oil filter attachment 406. Oil filter attachment 408 may include all of the features of oil filter attachment 406 as described in FIGS. 6D-6F.

Figure 7C:
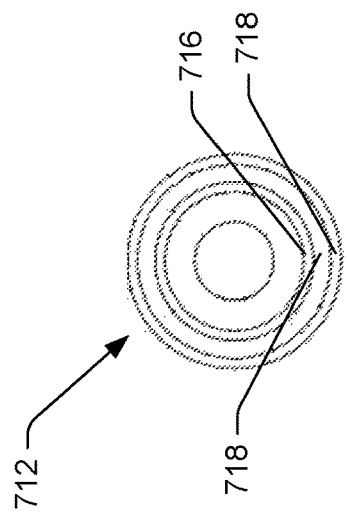
FIG. 7C illustrates a top view of another example docking collar that could be used with either the example oil filter adapter of FIG. 4B or 1B.
Figure 7B:
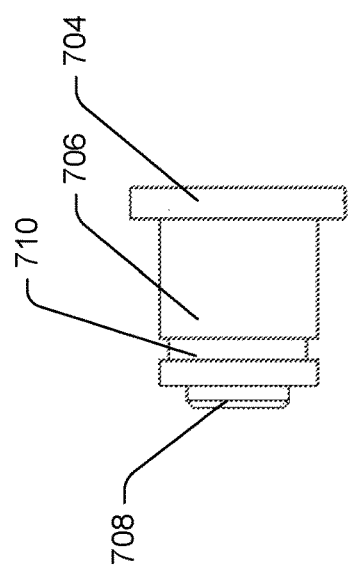
FIG. 7B illustrates a side view of another example docking collar that could be used with either the example oil filter adapter of FIG. 4B or 1B.
Figure 7A:
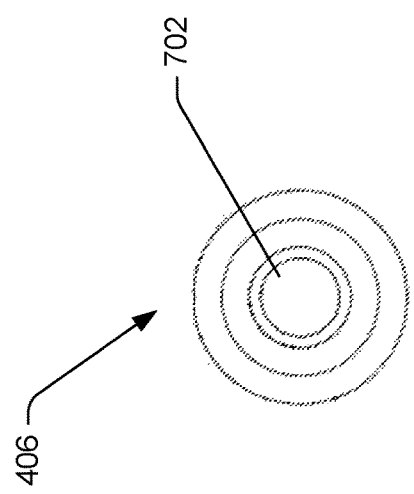
FIG. 7A illustrates a bottom view of another example docking collar that could be used with either the example oil filter adapter of FIG. 4B or 1B.

In some embodiments, the oil filter adapter 100 or oil filer adapter 400 may be coupled with a smaller docking collar than depicted in their respective figures. For instance, either oil filter adapter 100 or oil filter adapter 400 may be coupled with docking collar 700. FIG. 7A illustrates a bottom view of docking collar 700 with a passage 702. FIG. 7B illustrates a side view of docking collar 700, which may include a top portion 704, a middle portion 706, and a bottom portion 708. Additionally, there may be a recess 710 towards the bottom of middle portion 706 sized to couple with a retainer. The retainer may also act as a seal. The retainer may be a rubber O-ring. As illustrated in FIG. 7B, top portion 704 may have a larger diameter than middle portion 706, which may have a larger diameter than bottom portion 708. Middle portion 706 may be sized to fit inside recess 118 of base 102 or recess 422 of base 402. FIG. 7C illustrates a top view of docking collar 700. As illustrated in FIG. 7C, docking collar 700 may have a face 712 for coupling to an engine and/or an oil filter housing. Face 712 may have an outer wall 714 and an inner wall 716, forming recess 718. Recess 718 may be sized to contain a sealing mechanism, such as seal 114 or seal 416.

FIG. 8A illustrates an exploded view of oil filter adapter 400, which includes base 402, oil filter attachment 406, and docking collar 404. Additionally, FIG. 8A includes spring 800 with a spring diameter of 802 and a spring length of 804. Spring diameter 802 may be larger than the diameter of bottom portion 436 and smaller than a middle portion 434 of docking collar 404 such that when spring 800 is inserted into recess 422 and docking collar 404 is inserted into recess 422, then spring 800 is centrally aligned with docking collar 404. Spring 800 may have a length 804 that is longer than recess 422 such that when spring 800 is inserted into recess 422 and docking collar 404 is inserted into recess 422, spring 800 exerts an upward force on docking collar 404 so that retainer 806 makes contact with chamfered edge 452 of base 402.

FIG. 8B illustrates an exploded view of oil filter adapter 100, which includes base 102, oil filter attachment 106, and docking collar 104. Additionally, FIG. 8B includes spring 808 with a spring diameter of 810 and a spring length of 812. Spring diameter 810 may be larger than the diameter of bottom portion 146 and smaller than a middle portion 142 of docking collar 104 such that when spring 808 is inserted into recess 118 and docking collar 104 is inserted into recess 118, then spring 808 is centrally aligned with docking collar 104. Spring 808 may have a length 812 that is longer than recess 118 such that when spring 808 is inserted into recess 118 and docking collar 104 is inserted into recess 118, spring 808 exerts an upward force on docking collar 104 so that retainer 814 makes contact with chamfered edge 120 of base 402.

CONCLUSION

Although the disclosure describes embodiments having specific structural features and/or methodological acts, it is to be understood that the claims are not necessarily limited to the specific features or acts described. Rather, the specific features and acts are merely illustrative of some embodiments that fall within the scope of claims of the application.

What is claimed is:
1. An oil filter adapter comprising:
   a cylindrical base having a first end for coupling to an engine and a second end for coupling to an oil filter, the cylindrical base having an unfiltered oil passage and a filtered oil passage;
   a docking collar movably coupled to the cylindrical base, the docking collar having:
      a first end comprising a retainer for coupling to the first end of the cylindrical base;
      a second end comprising a sealing face for coupling to the engine; and
      a passage through a center of the docking collar in fluid communication with the filtered oil passage of the cylindrical base;
   a spring disposed within the filtered oil passage and interposed between the cylindrical base and the first end of the docking collar;
   a first oil filter attachment coupled with the second end of the cylindrical base for transporting unfiltered oil; and
   a second oil filter attachment coupled with the second end of the cylindrical base for transporting filtered oil.
2. The oil filter adapter of claim 1, wherein the first end of the docking collar is received in the filtered oil passage of the cylindrical base.
3. The oil filter adapter of claim 1, wherein the second end of the docking collar comprises a head having a first diameter that is wider than a second diameter of the first end of the docking collar.
4. The oil filter adapter of claim 3, wherein the second diameter of the first end of the docking collar is less than a third diameter of the filtered oil passage of the cylindrical base.
5. The oil filter adapter of claim 4, wherein the first diameter of the head of the docking collar is greater than the third diameter of the filtered oil passage of the cylindrical base.
6. The oil filter adapter of claim 3, wherein the sealing face of the second end of the docking collar comprises an O-ring at least partially disposed within the head of the docking collar to seal against a surface of the engine.

7. The oil filter adapter of claim 1, wherein:
the retainer comprises an O-ring disposed in a groove around an outer perimeter of the first end of the docking collar; and
the cylindrical base comprises a chamfered edge projecting inwardly from an inner wall of the filtered oil passage of the cylindrical base; and
the O-ring of the docking collar abuts against and is retained within the filtered oil passage of the cylindrical base by the chamfered edge.

8. An oil filter adapter comprising:
a cylindrical base having a first end for coupling to an engine and a second end for coupling to an oil filter, the cylindrical base having a passage for unfiltered oil and a passage for filtered oil;
a docking collar movably coupled with the first end of the cylindrical base and partially received in the passage for filtered oil;
a spring interposed between the docking collar and the passage for filtered oil such that the docking collar is compressible into the passage for filtered oil;
a first oil filter attachment coupled with the second end of the cylindrical base for transporting unfiltered oil; and
a second oil filter attachment coupled with the second end of the cylindrical base for transporting filtered oil.

9. The oil filter adapter of claim 8, wherein the cylindrical base further comprises a threaded section on an exterior of the cylindrical base used to couple with the engine.

10. The oil filter adapter of claim 8, wherein the docking collar comprises:
a first end comprising a retainer for coupling to the cylindrical base;
a second end comprising a sealing face for coupling to the engine; and
a passage through a center of the docking collar in fluid communication with the passage for filtered oil of the cylindrical base.

11. The oil filter adapter of claim 10, wherein the passage for filtered oil further comprises a chamfered edge sized to couple with the retainer of the docking collar.

12. The oil filter adapter of claim 11, wherein the chamfered edge is located at a top portion of the passage for filtered oil such that when the docking collar is coupled with the cylindrical base, the spring exerts a force on the docking collar, and the retainer makes contact with the chamfered edge and the docking collar remains coupled with the cylindrical base.

13. The oil filter adapter of claim 8, further comprising a plurality of passages for unfiltered oil disposed in the cylindrical base and extending between the first end of the cylindrical base and the second end of the cylindrical base, the plurality of passages being located between the passage for filtered oil and an edge of the cylindrical base.

14. The oil filter adapter of claim 8, wherein the oil filter is located remotely from the oil filter adapter and the first oil filter attachment is coupled with a first hose that transports unfiltered oil to the oil filter from the oil filter adapter, and the second oil filter attachment is coupled with a second hose that transports filtered oil from the oil filter to the oil filter adapter.

15. An oil filter adapter comprising:
a cylindrical base having a first end for coupling to an engine and a second end for coupling to at least one oil filter;
a docking collar movably coupled to the cylindrical base, the docking collar having:
a first end comprising a retainer for coupling to the cylindrical base, the retainer comprising a first O-ring;
a second end comprising a sealing face for coupling to the engine, the sealing face comprising a second O-ring;
a passage through the docking collar in fluid communication with a filtered oil passage of the cylindrical base; and
at least one oil filter attachment coupled with the second end of the cylindrical base.

16. The oil filter adapter of claim 15, wherein the cylindrical base further comprises a chamfered edge located inside the filtered oil passage of the cylindrical base that abuts against the retainer of the docking collar to retain the first end of the docking collar within the filtered oil passage.

17. The oil filter adapter of claim 15, further comprising a spring interposed between the first end of the docking collar and a bottom portion of the filtered oil passage of the cylindrical base.

18. The oil filter adapter of claim 15, wherein the at least one oil filter attachment comprises:
a first oil filter attachment coupled with the second end of the cylindrical base for transporting unfiltered oil; and
a second oil filter attachment coupled with the second end of the cylindrical base for transporting filtered oil.

19. The oil filter adapter of claim 18, wherein the at least one oil filter is located remotely from the oil filter adapter and the first oil filter attachment is coupled with a first hose that transports unfiltered oil to the at least one oil filter from the oil filter adapter, and the second oil filter attachment is coupled with a second hose that transports filtered oil from the at least one oil filter to the oil filter adapter.

* * * * *